United States Patent [19]

Hodge

[11] Patent Number: 4,506,946

[45] Date of Patent: Mar. 26, 1985

[54] OPTIC FIBER COUPLING GUIDE, METHOD OF MAKING THE SAME AND METHOD OF USE

[75] Inventor: Malcolm H. Hodge, Claymont, Del.

[73] Assignee: TRW Inc., Redondo Beach, Calif.

[21] Appl. No.: 968,045

[22] Filed: Dec. 8, 1978

Related U.S. Application Data

[63] Continuation-in-part of Ser. No. 838,350, Sep. 30, 1977, abandoned, which is a continuation-in-part of Ser. No. 758,106, Jan. 10, 1977, abandoned.

[51] Int. Cl.$^3$ ................................................ G02B 7/26
[52] U.S. Cl. ................................. 350/96.21; 350/96.20
[58] Field of Search ............... 350/96.20, 96.21, 96.22, 350/320; 65/4 B, 4.1, 4.2

[56] References Cited

U.S. PATENT DOCUMENTS

| | | | |
|---|---|---|---|
| 3,870,395 | 3/1975 | Schicketanz | 350/96.21 |
| 3,871,744 | 3/1975 | Bridger et al. | 350/96.21 |
| 3,885,859 | 5/1975 | Dalgleish et al. | 350/96.21 |
| 3,902,785 | 9/1975 | Matthews | 350/96.21 |
| 3,919,037 | 11/1975 | Miller | 156/502 |
| 3,936,143 | 2/1976 | Sato | 350/96.21 |

List continued on next page.

FOREIGN PATENT DOCUMENTS

| | | | |
|---|---|---|---|
| 2602661 | 7/1977 | Fed. Rep. of Germany | 350/96.21 |
| 1558605 | 1/1980 | United Kingdom | |

OTHER PUBLICATIONS

Thiel et al., "Low Loss Splicing and Connection of Optical Waveguide Cables", *S.P.I.E.*, vol. 63, Aug. 20, 1975, Guided Opt. Comm., pp. 109-113.

Miller, "Loose Tube Splices for Optical Fibers", *Bell Syst. Tech. Journal*, vol. 54, No. 7, Sep. 1975, pp. 1215-1225.

Fenton et al., "Connecting the Thread of Light", 9th *Annual Connectors Symposium*, Oct. 20-21, 1976, Cherry Hill, N.J., pp. 64-72.

Thiel et al., "Optical Waveguide Cable Connection", *Applied Optics*, vol. 15, No. 11, Nov. 1976, pp. 2785-2791.

Bedgood et al., "Demountable Connectors for Optical Fiber Systems", *Electrical Commun.*, vol. 51, No. 2, 1976, pp. 85-91.

"An Injection-Molded Plastic Connector for Splicing Optical Cables", by A. H. Cherin & P. J. Rich, The Bell System Technical Journal, vol. 55, No. 8, 10/76, pp. 1057-1067.

*Primary Examiner*—John Lee
*Attorney, Agent, or Firm*—John T. Wiedemann; Joseph P. Calabrese

[57] ABSTRACT

A guide for use in making an optical signal transmissive connection between the ends of a pair of single optic fibers. The guide comprises a body having a mid-portion and a pair of end portions and defining a channel extending through said body and having open ends. The channel includes a tapered upper corner which extends longitudinally along the mid-portion of the body. The end portions of the channel extend downward at an acute angle to the mid-portion of the body so that a fiber inserted into an open end of the channel is automatically guided into the upper corner in the mid-portion of the channel. In some embodiments the guides are formed of at least three pre-determined length glass rods which are disposed in a side-by-side array parallel to one another with longitudinal peripheral portions of adjacent rods in contact with and connected to each other to form a cusp-shaped interstitial channel therebetween and with one cusp forming the corner. In another embodiment, the body is formed of a hollow tubular member whose intersecting walls form the interstitial channel with its attendant top corner. In the preferred embodiment of the guide, the mid-portion of the channel is straight while the end portions are also straight but extend downward at an acute angle to the mid-portion. A method for forming the guide is also disclosed.

55 Claims, 19 Drawing Figures

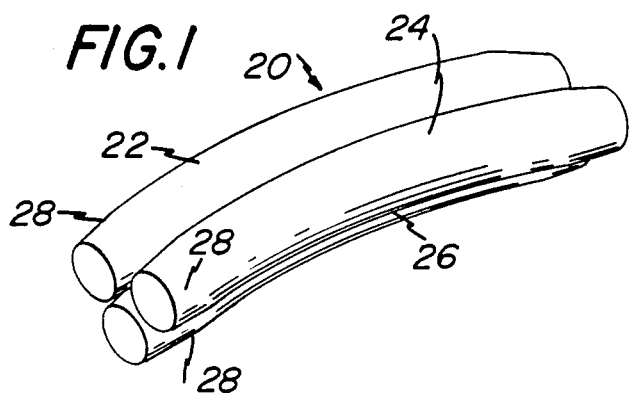
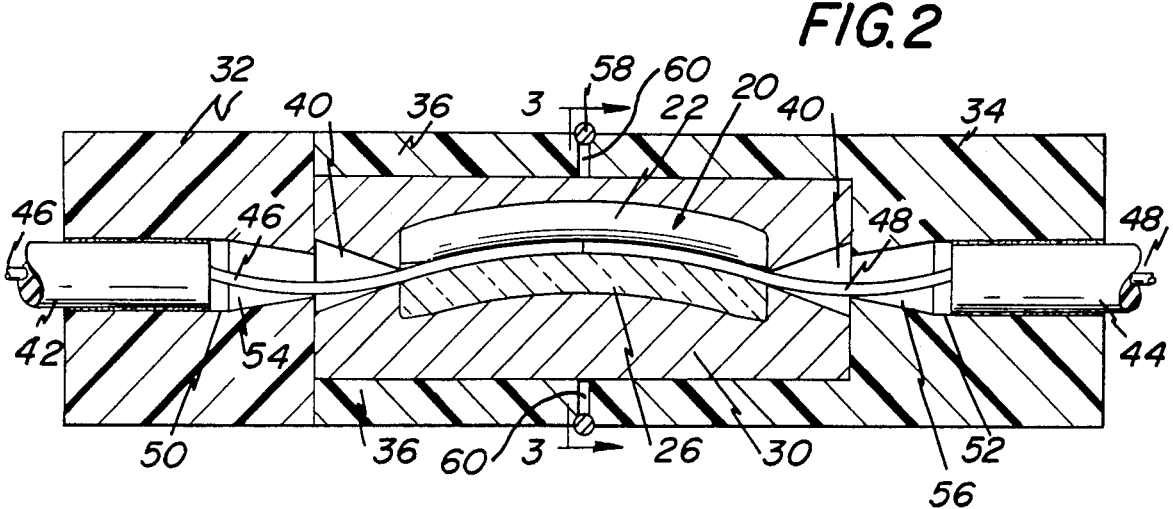
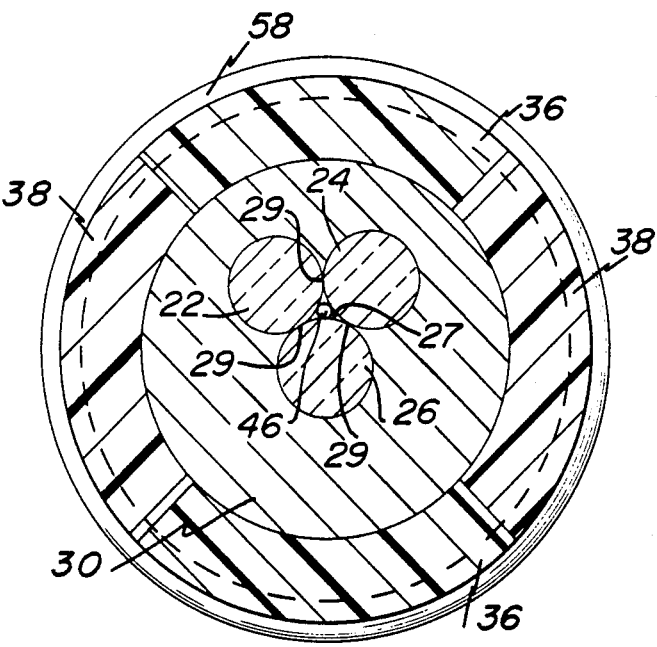

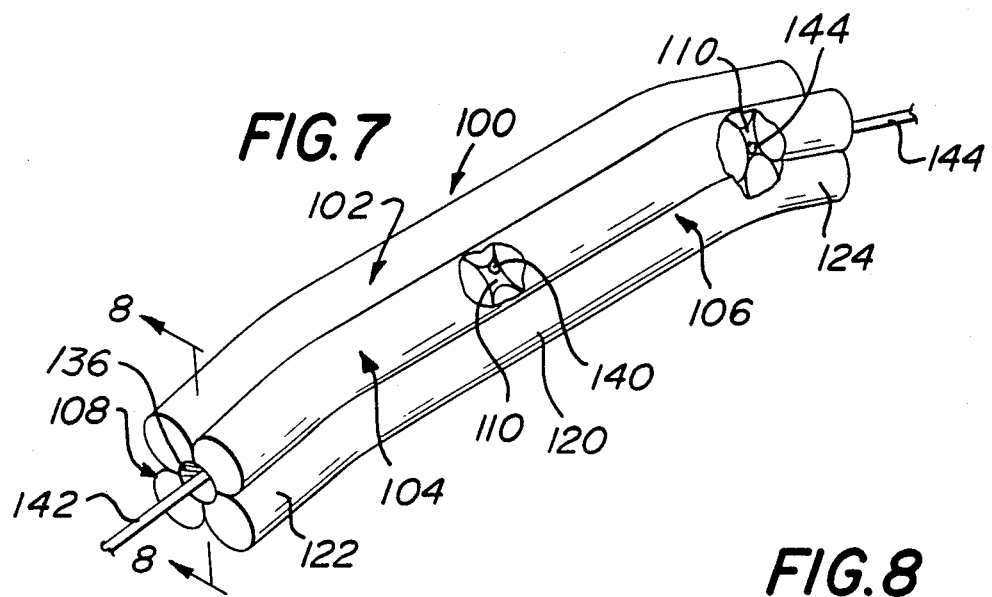
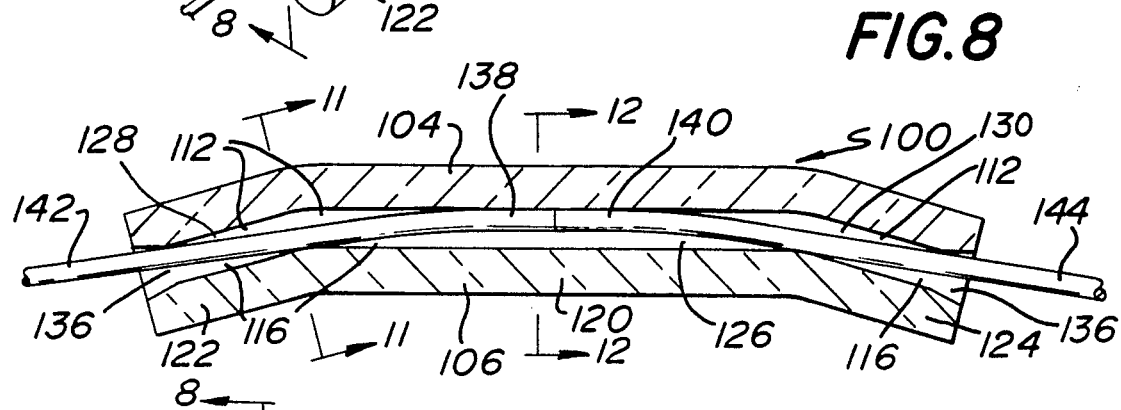
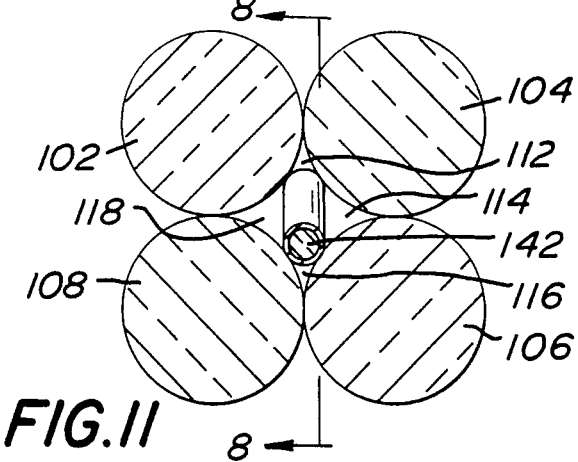
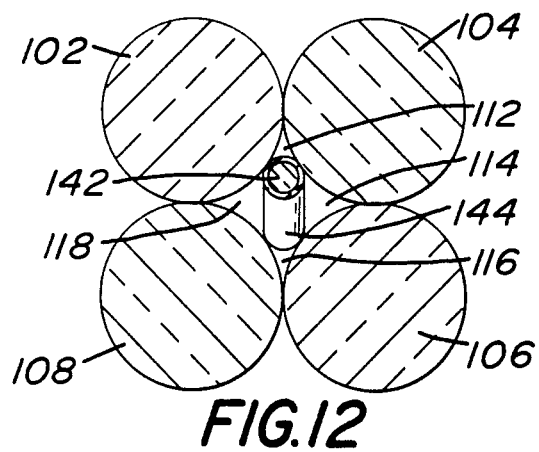
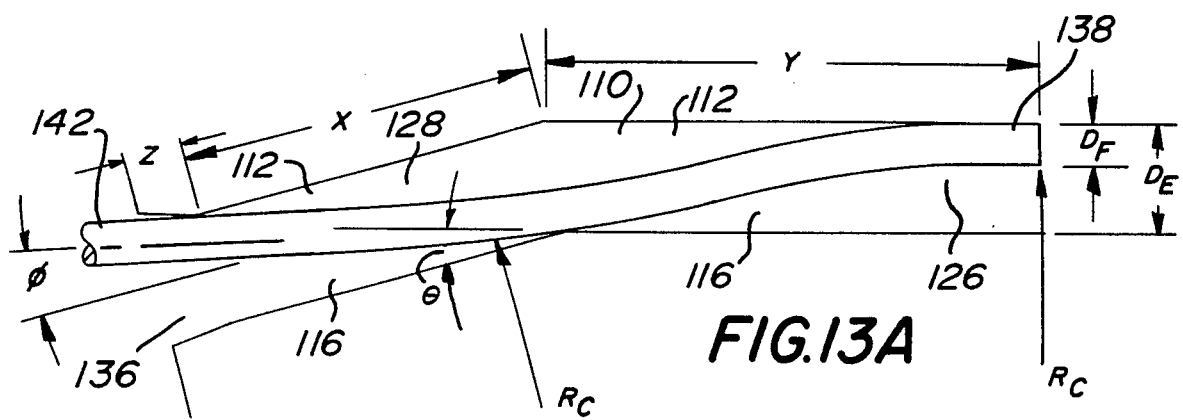

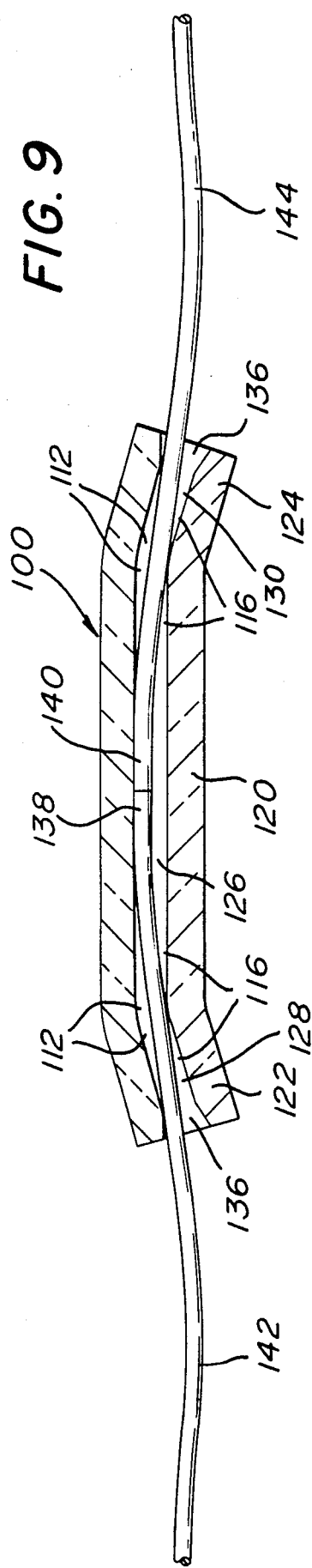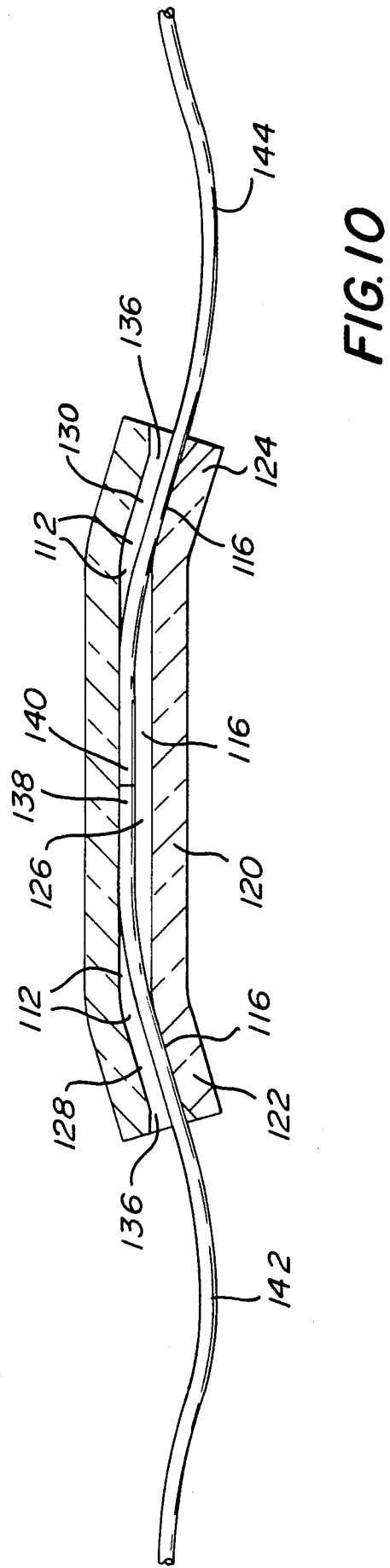

OPTIC FIBER COUPLING GUIDE, METHOD OF MAKING THE SAME AND METHOD OF USE

This application is a continuation-in-part of my co-pending U.S. application Ser. No. 838,350, entitled Optic Fiber Coupling Guide, filed on Sept. 30, 1977 (now abandoned) and which in turn is a continuation-in-part of my co-pending U.S. application Ser. No. 758,106, entitled Guide-Connector Assembly for Joining Optical Fibers, filed on Jan. 10, 1977 (now abandoned), the disclosures of both said applications are incorporated by reference herein. A streamlined continuation application based on U.S. application Ser. No. 758,106, matured into U.S. Pat. No. 4,192,575 on Mar. 11, 1980.

My U.S. patent application Ser. No. 758,106 discloses a guide connector assembly for making an optical signal transmissive connection between the ends of a pair of single optic fibers. The assembly includes a straight guide member in the form of three pre-determined length glass rods disposed in a parallel side-by-side array and connected together longitudinally along peripheral portions to form a cusp-shaped interstitial channel therebetween.

The guide is disposed within a cavity in the connector and the connector is formed of a pair of mating connector members. Each member includes a first and a second end with a passageway extending longitudinally therebetween and through which a respective fiber passes and terminates in a hollow portion adjacent the second end.

The members are connected together at their second ends with their hollow area forming the guide receiving cavity. Each of the passageways includes an enlarged opening adjacent to the first end and tapering downward in the cross-sectional areas towards the entrance to the cavity. The cross-sectional area of the passageway at the entrance to the cavity is slightly larger than the cross-sectional area of the optical fiber to accurately position the fiber extending therethrough and into the guide member.

Each of the connection members includes an alignment aperture to provide visual access to the interior of the cavity to ensure that each fiber is extended a predetermined distance within the connection member so that when the connection members are connected together the fiber ends abut within the guide member in a good optical signal transmissive joint.

It has been found that the guide-connector assembly shown in my U.S. patent application Ser. No. 758,106 has greatly facilitated the connection between the ends of a pair of optical fibers. The alignment capabilities of the guide used in said guide-connector assembly aligns very accurately the fiber optics connected to each other where the diameter of the fiber optics closely matches the inside diameter of the opening in the interstitial channel formed between the rods of the guide member.

The guides of the instant invention comprise an improvement over the guide disclosed in my U.S. patent application Ser. No. 758,106 by providing means which align more accurately optic fibers which are not substantially similar in outside diameter to the inside diameter of the interstitial channel in the guide and also enables a range of fiber optic diameters to be used with a single size guide.

Accordingly, it is a general object of this invention to provide guides for use in a guide-connector assembly which retain the advantages of the invention disclosed in my U.S. patent application Ser. No. 758,106, while enabling a guide to be manufactured with a looser tolerance to accommodate fiber optic ends while maintaining a high degree of alignment between the fiber optic ends.

Another object of the invention is to provide a guide for a guide-connector assembly which is simple in construction and which in connection with a connector can be used to effect a low loss junction between a pair of fiber ends.

It is still a further object of this invention to provide a re-usable guide-connector assembly which facilitates the precise positioning and alignment of a pair of optical fibers of a large range of diameters.

It is still a further object of this invention to provide a guide for optic fibers for precisely aligning the fibers co-axially and to provide an assembly which is easily adaptable for disposition within a connector assembly.

These and other objects of the invention are achieved by providing a guide for use in making an optical signal transmissive connection between the ends of a pair of single optic fibers. The guide comprises a body having a channel extending therein. The channel includes a mid-portion and a pair of end portions, each having an open end and extending downward at an angle to the mid-portion. The mid-portion of the channel includes an upper corner which extends longitudinally along the mid-portion of the channel. An optic fiber inserted into the end of the channel is automatically guided by the angularly extending end portion and the mid-portion of the channel into the upper corner for alignment with another optic fiber located therein.

In the preferred embodiment of the guides of this invention, the mid-portion of the channel is linear.

The guides can be formed in many ways, some embodiments are formed of at least three, preferably four, pre-determined length cylindrical members disposed in a side-by-side array parallel to one another, with longitudinal peripheral portions of adjacent members in contact with each other to form the channel therebetween. The channel is cusp-shaped, with one of its cusps forming the upper corner.

Other objects and many of the attendant advantages of the instant invention will be readily appreciated as the same becomes better understood by reference to the following detailed description when considered in connection with the accompanying drawings, wherein:

FIG. 1 is a perspective view of the optic fiber coupling guide embodying the invention;

FIG. 2 is a vertical sectional view taken through a guide connector assembly embodying the instant invention shown connecting the ends of a pair of single optic fiber cables together;

FIG. 3 is an enlarged sectional view taken along the line 3—3 in FIG. 2;

FIG. 7 is a perspective view of a preferred embodiment of the optic fiber coupling guid embodying the instant invention;

FIG. 8 is a longitudinal sectional view of the guide shown in FIG. 7 and taken along line 8—8 therein and along line 8—8 of FIG. 11 and showing the fibers in full;

FIG. 9 is a partial sectional view, similar to that of FIG. 8 but showing the fibers being brought on axis external to the guide so that they bow slightly;

FIG. 10 is a partial sectional view, similar to that of FIG. 9 but showing a condition in which the fibers external to the guide are more greatly bowed;

FIG. 11 is an enlarged transverse sectional view taken along line 11—11 of FIG. 8;

FIG. 12 is an enlarged vertical sectional view taken along line 12—12 of FIG. 8;

FIG. 13A is a schematic diagram of a longitudinal section of one end of the guide shown in FIG. 7;

FIG. 17 is a longitudinal sectional view of a guide made in accordance with the teachings of this invention made in engagement with a light emitting diode.

Figure 4:
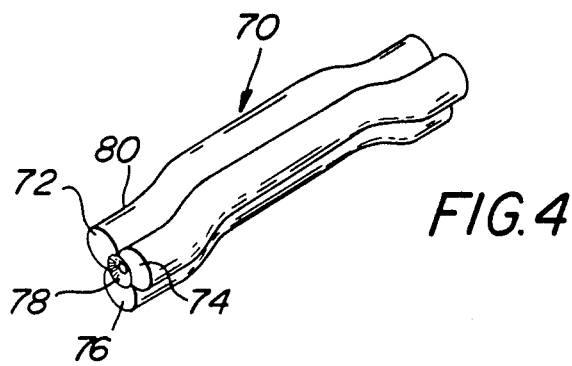
FIG. 4 is a perspective view of another embodiment of an optic fiber coupling guide embodying the instant invention.

Referring now to the various figures of the drawings wherein like reference characters refer to like parts, there is shown at 20 in FIG. 1 a guide for use in guide-connector assembly for use in a fiber optic system to effect both temporary and permanent connections between a pair of optic signal carrying fibers.

The guide member 20 comprises at least three identical elongated rod-shaped members 22, 24 and 26. The rods are preferably comprised of a hard material having a smooth surface with the preferred material being glass.

The members 22, 24 and 26 are disposed in a side-by-side parallel array with longitudinal portions abutting and connecting together the rods (See FIG. 3 at 29). The array of rod-shaped members form a central interior space or channel 27 between the rods which extends along the full length of the guide.

The interior space 27 is in the form of a central channel including plural cusp-shaped interstices, each interstice lying within the space between a respective pair of abutting rod-shaped members and terminating at the abutting portions 29 of the rod-shaped members. The cusp-shaped channel extends the full length of the rod-shaped member.

Each of the rods 22, 24 and 26 is arcuately bent, with the rods 22 and 24 being aligned along the outermost edge of the radius of curvature of the guide 20. The rod 26 which abuts rod 22 and 24 lies along the innermost radius of curvature of the arcuately shaped guide member 20.

The channel 27 is arranged to receive the ends of the optic fibers to be joined to align them co-axially. The particular diameter of the rod-shaped members is selected so that the diameter of the central portion of the channel formed therebetween is larger than the diameter of the fibers to be joined.

The arcuate shape of the rod-shaped members 22, 24 and 26 causes the optic fibers inserted in the channel 27 to be urged against the corners of interstice of channel 27 formed between rods 22 and 24 thereby causing the periphery of the optic fibers to abut the periphery of rods 22 and 24 in the interstice of channel 27.

Thus, in view of the fact that the arcuate shape forces the optic fibers to be urged into the corner or interstice between rods 22 and 24, it is less critical that the diameter of the optic fibers be closely matched to the inside diameter of the channel 27. Accordingly, smaller diameters of optic fibers than the diameter of channel 27 can be aligned because the ends of both fiber optics will, when inserted in opposite ends of guide 20, be urged equally into the corner or interstice between rods 22 and 24.

It can therefore be seen that guide member 20 enables a single guide member to be used with a plurality of diameters of optical fibers for connecting the ends thereof, as well as enabling the guide member to be used with lower tolerances as to the difference in the diameters between the channel 27 and the optical fiber ends.

The guide member 20 is preferably formed of glass by drawing larger diameter glass rods down to the required size and into contact with each other while hot so that the longitudinal portions of their peripheral edges contact and fuse together at 29 (see FIG. 3).

The glass is important not only from a fabrication viewpoint, but is also substantially important from a functional standpoint. In this respect, glass is less susceptible to shrinkage, thereby insuring dimensional stability for the guide. In addition, the glass provides a hard yet smooth interstitial surface which is low in abrasiveness and is abrasion resistant. These features insure that the optical fibers used therein, which are usually covered by a softer material, such as plastic, are not scored, scraped, or otherwise damaged when inserted in the guide, nor will the guide be damaged, either of which occurrences will result in an unnecessary strength loss through the damaged surface. Moreover, the transparency of the glass guide enables the viewing of the positioning of the fiber ends therein, thereby facilitating the connection of the fibers.

The cusp shape of the interstitial channel enables the fiber optic ends to contact only the innermost surface portions of the rod-like members 22, 24 and 26. Thus, there is little frictional engagement between the fiber optics and the rods when the fiber is inserted within the interstitial channel. Moreover, because the fiber optic ends are forced into the interstice between rod members 22 and 24, the fiber ends are held in place within the guide precisely axially aligned and centered where the diameters of the fiber optic ends are equal.

To facilitate the insertion of the small diameter optic fibers into the channel 27 in the guide member 20, each open end of channel 27 is of greater cross-sectional area than the remaining portion of the channel (see FIG. 2). The enlargement of the opened end of the channel 27 can be formed by dipping the ends of the guide member into an acid bath, e.g., hydroflouric acid, to etch away or taper the free ends of the rod-like members as shown at 28 in FIG. 1.

Referring to FIG. 2, the guide 20 is shown in use in a connector assembly.

In order to facilitate the use of the guide member 20 it is preferably provided in a cylindrical housing 30 which facilitates the use of the guide member in the connecting member.

The material used for the housing is preferably an injection molding plastic such as Nylon, ABS, Styrene, Noryl or a castable plastic, such as epoxy resins.

At each end of the cylindrical housing 30 a tapered frusto conically shaped opening 40 is provided to enable access to the ends of the channel 27 which extends through the guide 20.

In the embodiment shown in FIG. 2, the connector comprises a pair of hermaphroditic mating connector members 32 and 34.

The connector members 32 and 34 are identical in size and shape. Connector member 34 includes a pair of fingers or prongs 36 which, as seen in FIG. 3, are arcuate in cross-section and provided on opposing diametric sides of the connector member 34. As best seen in FIG. 3, the connector member 32 includes a pair of prongs 38 which are of arcuate cross-section and which are provided on opposite diametric sides of the connector member 32. The prongs 36 and 38 of the members 34 and 32, respectively, interfit with respect to each other to form an annular ring forming a housing for reception of guide member 20 in cylindrical housing 30.

The connector member 32 is attached to a cable 42. Connector member 34 is connected to a single fiber optic cable 44. Cable 42 includes a single fiber optic 46 which is preferably secured to the cable 42 by an epoxy adhesive which is provided between the fiber optic 46 and the cable at the end of the cable. Cable 44 includes a single optical fiber 48 which is also secured to the end of cable 44 in the same manner as optical fiber 46 to cable 42.

A cylindrical bore 50 extends from the outer end of the connector member 32 a substantial distance into the body of the member. The cable 42 is secured in opening 50 by a suitable adhesive applied about the periphery of the cable to secure the cable to the connector member 32 within opening 50. Similarly, the cable 44 is provided in a cylindrical opening 52 which extends for a substantial distance from the outer end of connector member 34 into the body of the member. The opening 50 of connector member 32 is tapered at 54 and extends into the cavity formed between prongs 36 and 38. Opening 52 of connector member 34 is tapered at 56 and extends into the cavity formed between prongs 36 and 38.

The fiber optic ends of optic fibers 46 and 48 thus extend from cables 42 and 44 into the openings 40 of the cylindrical housing 30 and into the interstitial channel 27 formed in the guide member 20 within rods 22, 24 and 26.

In order to insure that the fiber ends of optic fibers 46 and 48 abut each other securely when the cables 42 and 44 are secured in connectors 32 and 34, the ends of the fiber optics 46 and 48 are cut to predetermined lengths which are aided by a pair of longitudinally aligned apertures 60 as more fully described in my U.S. application Ser. No. 758,106.

The prongs 36 and 38 also have an annular recess provided about the outer surface thereof, about which an O-ring 58 is secured after the connector members 32 and 34 are engaged with each other and the prongs 36 and 38 are abutting the opposite connector member body as shown in FIG. 2. The O-ring 58 thus holds together the connector members 32 and 34. The optic fiber ends disposed within guide member 20 have their transmissive connection enhanced by the provision of an oil provided within the interstitial channel 27 which is of a refractive index which matches the refractive index of the cores of the optical fibers.

Where a permanent connection is desired as opposed to a releasable connection, an index matching epoxy may be used within the interstitial channel to secure the fiber ends therein.

In FIG. 4 a preferred embodiment of the guide of the instant invention is shown. In the embodiment shown in FIG. 4 the guide member comprises three similarly elongated rod-shaped members 72, 74 and 76 which are preferably made of glass. The members 72, 74 and 76 are disposed in a side-by-side parallel array with longitudinal portions abutting and secured together thereto. The rod-shaped members are secured together and form a guide member by drawing heated cylindrical rod and thereby integrally securing the rods in a parallel side-by-side array.

After the rods are cut to a predetermined length, the tapered opening 78 of each end is then formed by inserting a hot dowel into the ends of the guide member 70.

The ends of the guide 70 are bent so that a central portion which is straight remains with a pair of ends which are laterally displaced from the axis of the central portion and substantially parallel thereto. The ends of the guide member 70 are thus bent about a first radius 82 at the ends of the straight central portion of the guide member causing the ends to be extended laterally to one side of said central portion. The ends are then bent as the guide member extends outwardly at 80 to thereby bend the ends into a disposition substantially parallel to the straight portion of the guide member.

The rod-shaped members 72, 74 and 76 form a central interior space or channel 84 between the rods which extends along the full length of the guide.

The interior space 84 is in the form of a central channel which includes a cusp-shaped interstice with each interstice lying between a respective pair of abutting rod-shaped members.

It should be noted that the rods 72 and 74 are laterally aligned in the direction most spaced from the direction that the ends of the rod are spaced from the central portion of the guide member 70.

Figure 6:
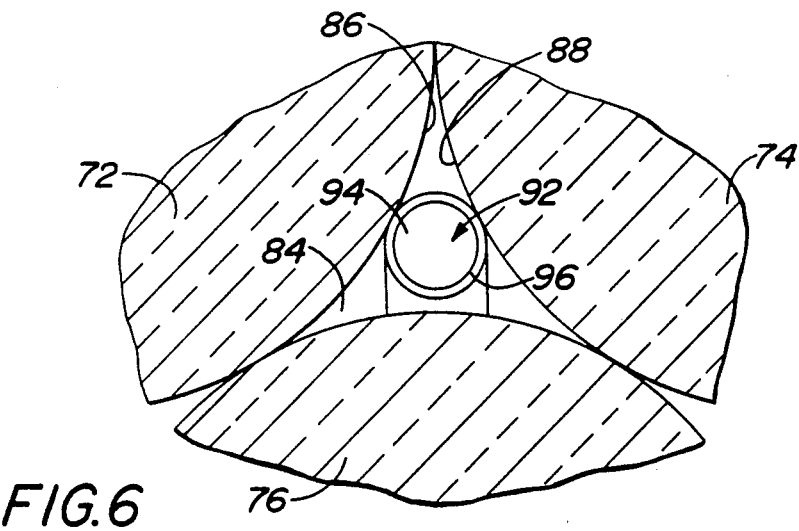
FIG. 6 is an enlarged sectional view taken along the line 6—6 in FIG. 5.

Thus, when an optic fiber is inserted into the interstitial channel in guide member 70, the optic fiber is urged into the interstice between rod members 72 and 74. Thus, as seen in FIG. 6, an optic fiber is urged against the peripheral surfaces 86 and 88 of the rods 72 and 74 of the guide 70. The interstitial channel diameter can be at least twice the diameter of the optic fibers it can couple efficiently.

Figure 5:
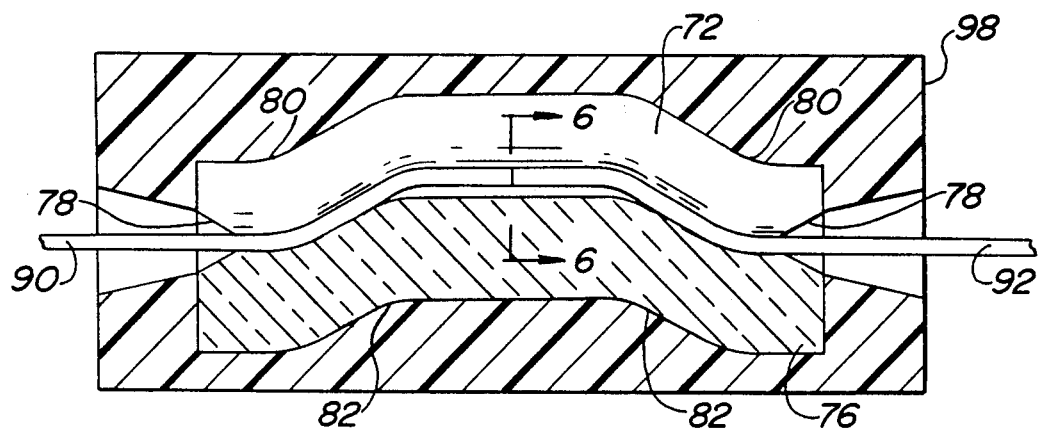
FIG. 5 is a vertical sectional view of the guide shown in FIG. 4 shown connecting the ends of a pair of single optic fiber cables together.

The provision of the arcuate bends in the guide member 70 and having a central straight portion, further facilitates the alignment of a pair of fiber optic ends inserted at opposite ends of and into the guide 70. That is, as seen in FIG. 5 an optic fiber 90 inserted in the left side and a fiber optic 92 inserted in the right side of the guide will cause a precise axial alignment in centering of the ends of the optical fibers 90 and 92. That is, as seen in FIG. 6 the optic fiber 92 is urged into the interstice between rods 72 and 74 and thereby causes optical fiber 92 to be urged as far into the corner as it is possible when the fiber optic abuts the walls 86 and 88 of rods 72 and 74, respectively. Similarly, fiber 90 abuts the surfaces 86 and 88 in the same manner and thus when the optical fibers are urged against each other because of the straight portion in the central portion of the guide member 70 there is very close abutment of the fiber optic ends. The light transmissiveness is enhanced further by providing an index matching oil in the interstices 84. As seen in FIG. 6 the optic fiber 92 includes an optic core 94 and a cladding 96 having a different refractive index to facilitate light retention within the core of the optic fiber.

It should also be noted that the glass rods 72, 74 and 76 possess a refractive index which is specifically different from the fiber optic refractive index so that light retention within the light transmissive path is enhanced.

The guide member 70 is also preferably secured in a cylindrical housing 98 which preferably comprises an injection molded thermoplastic or castable plastic.

Housing 98 is formed similarly to housing 30 for guide member 20. Similarly, the guide member 70 in housing 98 is used as shown in FIG. 2 with respect to guide member 20.

As should be appreciated from the foregoing, the guide-connector assembly embodying the invention enables the quick and efficient end-to-end mating connection of a pair of single optical fibers. This connection may be readily disconnected if desired, by removal of the O-ring 58 from the peripheral recess about the prongs thereby unlocking the connector members 32 and 34. The connector members 32 and 34 are then separated, thereby disconnecting the fiber ends within the guide member 20 or 70. Reconnection of the fiber ends can be accomplished by inserting the fiber optic ends within the cylindrical housing 30 or 98 for the guide members, thereby causing the fiber optic ends to be aligned by the guide members of the invention.

It should also be seen that by having arcuate portions in the guide members embodying the invention, a range of diameters of optic fibers can be mated with a single sized guide member. Also, the tolerance required of the outer diameter of the optical fiber with respect to the inner diameter of the interstitial channel within the guide member is also reduced. Also as the arcuate portions of the guide member cause the optical fibers to deviate off the axis of the connector, should the optical fibers come into contact prior to complete closure of the connector members 32 and 34, a bias flexure is provided which obviates excess pressure at the fiber faces and attendant fiber degradation. This feature allows for loose tolerance in fiber length specification. These advantages are accrued while retaining all of the advantages of my aforesaid parent application.

The provision of cylindrical housings which are formed about the guide members 20 and 70 further acts to facilitate a quick connection between fiber ends by disposing the entry openings into the guide members by locating the openings centrally of the connector members when the cylindrical housings are inserted into the cavities formed between the prongs of the connectors.

Moreover, the cylindrical housing further enables the guide member to be inserted without requiring any alignment angularly with respect to the connector members since the open ends remain axially located within the connector member.

Finally, the cylindrical housing further provides a large enough opening to further facilitate the insertion of the optic fiber ends into the ends of the guide member.

Figure 14:
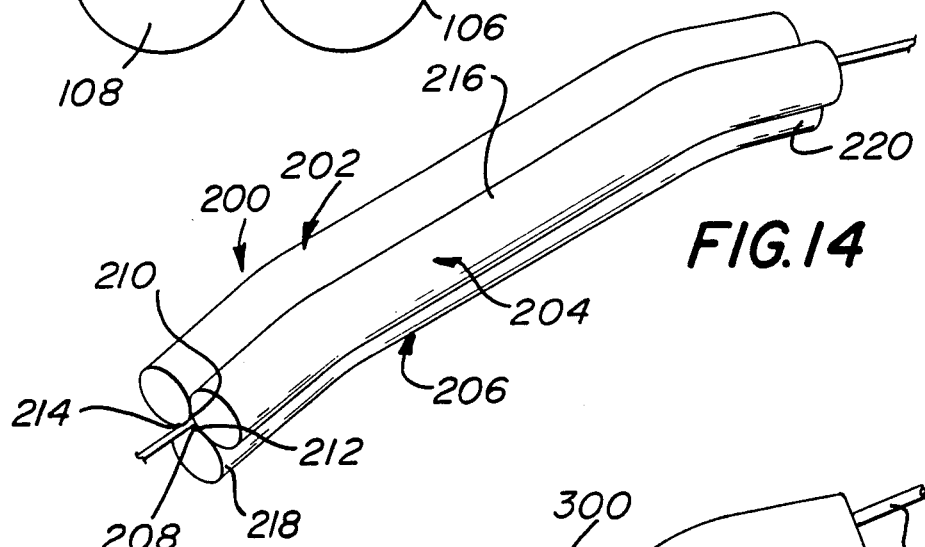
FIG. 14 is a perspective view of another embodiment of an optic fiber coupling guide embodying the instant invention.
Figure 15:
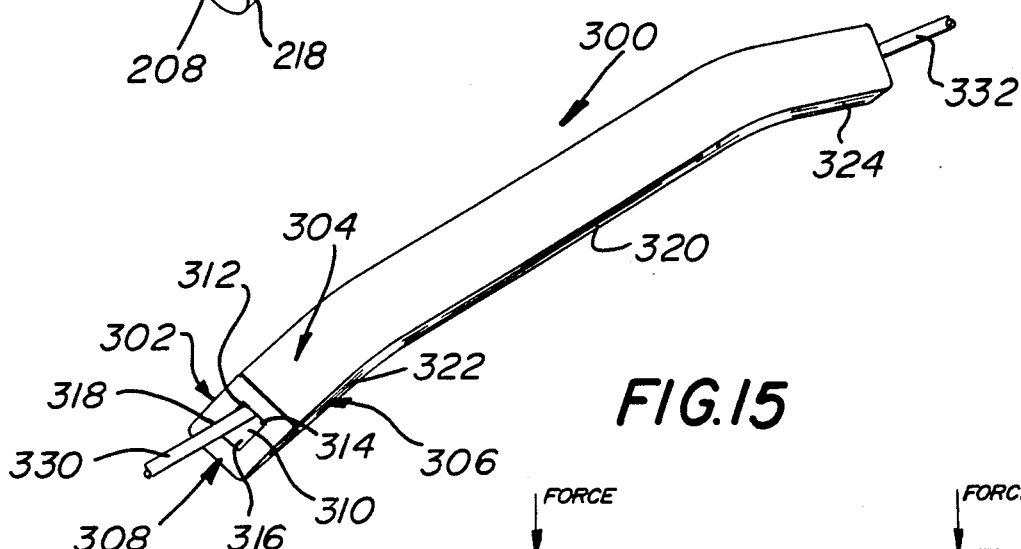
FIG. 15 is a perspective view of yet another embodiment of an optic fiber coupling guide embodying the instant invention.

In FIGS. 7, 14 and 15, there are shown still further embodiments of optic fiber guides constructed in accordance with my invention. The guides shown in FIGS. 7, 14 and 15 are referred to hereinafter as double elbow end guides and will be described in detail hereinafter. Suffice for now to state that the double elbow end guides of this invention are constructed to not only ensure that the ends of a pair of optic fibers are precisely aligned angularly as well as axially and without requiring high dimensional tolerance fibers and/or guide components, but also to ensure that the fiber ends are not damaged in the event that an attempt is made to impel the fibers further into the guide once their ends have met.

The embodiment of my optic fiber guide shown in FIG. 7 is identified by the reference numeral 100 and basically comprises an assembly of four cylindrical members, e.g., rods, 102, 104, 106 and 108. Each member is preferably formed of glass. The members are disposed in a substantially square array parallel to one another and side-by-side, with abutting peripheral surfaces in contact. The members are held together by any convenient means, but are preferably connected together to form an integral unit. The disposition of the rods 102-108 parallel to one another forms an interstitial channel 110 between the contiguous portions of the rods and extending the full length of the guide. The channel 110 is cusp-shaped in cross-section and includes four cusp-shaped interstices 112, 114, 116 and 118 (FIG. 11). The upper cusp 112 is formed by the adjoining peripheral surfaces of cylinders 102 and 104, the right lateral cusp 114 is formed by the adjoining peripheral surfaces of cylinders 104 and 106, the lower cusp 116 is formed by the adjoining cylinders 106 and 108 and the left lateral cusp 118 is formed by the adjoining converging peripheral surfaces of cylinders 108 and 102. As can be seen clearly in FIGS. 7 and 8, the guide 100 includes a straight central or mid-portion 120 and a pair of end portions 122 and 124. The end portions 122 and 124 are identical and each extends at an acute angle to the mid-portion so that the guide's channel 110 includes a straight mid-portion 126 and a pair of end portions 128 and 130, each of which extends at an acute angle to the mid-portion. The ends of the channel are open at 136.

The angularly extending end portions of the channel and the straight mid-portion of the channel cooperate to bias the end portions 138 and 140 of a pair of optic fibers, 142 and 144, respectively, inserted through the respective ends of the channel to align the ends of the fibers within a preselected interstice or cusp of the channel and with each fiber end extending parallel to the longitudinal axis of the mid-portion. This feature assures that a good low light loss optical interface or joint is created between the adjacent fiber ends.

It must be pointed out at this juncture that the guides of the instant invention can take various alternative forms so long as the guide includes a channel having portions forming a unique interstice into which the optic fiber is automatically biased. The interstice may be in the form of a corner, a cusp or any other converging space and may be formed of a plurality of cylindrical members, like the embodiments shown in FIGS. 1, 4, 7 and 14, or of a hollow tube like the embodiment of FIG. 15. Moreover, for guide embodiments composed of plural cylindrical members, such members need not be formed as solid rods, like rods 102-108 of guide 100. To that end each member may be of alternative construction, e.g., a hollow tube, so long as their adjoining converging surfaces form a corner, cusp or other converging interstice into which the fiber is automatically biased.

Figure 13B:
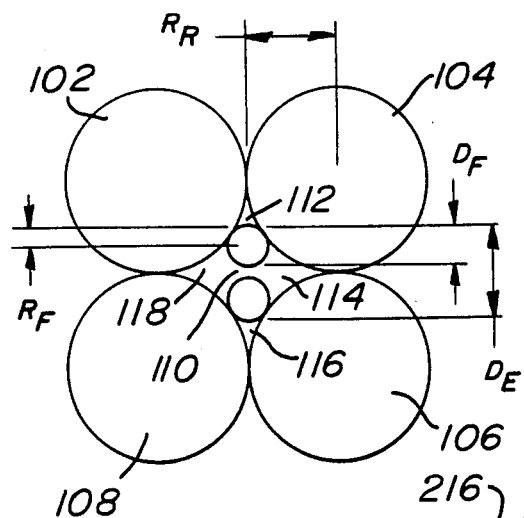
FIG. 13B is a schematic diagram of a transverse section of one end of the guide shown in FIG. 7.

Like other guides disclosed herein, the guide 100 does not make use of a tight fit of the fiber within the channel to effect fiber alignment. Accordingly, the guide 100 can be used to align optic fibers whose outside diameter is substantially smaller than the effective diameter of the channel. The term effective diameter of the channel means the limits of tranverse movement of a fiber in the channel in a given direction, e.g., vertical. In FIG. 13B, the effective channel diameter $D_E$ of the guide 100 is shown schematically. The outside diameter of the optic fiber is denoted by the legend $D_F$ and its radius $R_F$ in FIG. 13B, while the radius of each rod 102–108 is shown as $R_R$.

As will be appreciated by those skilled in the art, since each fiber 142 and 144 is of a smaller outside diameter than the effective diameter of the channel and since the ends of the channel extend downward at an acute angle to the straight central portion, the insertion of a fiber end, 138 or 140, into one end of the channel causes it to initially make contact with and move into the lower cusp 116 in the end portion 122 or 124 of the guide. Continued insertion of the fiber into the guide causes the end of the fiber to slide up the cusp 116. At some point in the continued insertion of the fiber into the guide, an upstream top surface portion of the fiber makes contact with and moves into the upper cusp 112 at the open end (mouth) of the channel while the fiber end is still within the lower cusp 116. Continued insertion of the fiber causes the fiber end to pass over the elbow (i.e., the point at which the mid-portion of the channel merges with the end portion) and into the mid-portion 126 of the channel, heading toward the top cusp 112. Continued insertion of the fiber in the channel causes the fiber end to make contact with the top cusp. Once the end of the fiber makes contact with the top cusp, the fiber is constrained as follows: The end of the fiber is in contact with the upper cusp 112 in the straight mid-portion 126 of the channel, an upstream portion of the fiber is in the lower cusp 116 adjacent the elbow and a further upstream portion of the fiber is in the upper cusp at the mouth of the channel. Continued insertion of the fiber into the channel causes the portion of the fiber contiguous with the end to bend, while the end itself slides linearly along the top cusp 112 until the longitudinal axis of the fiber end is disposed parallel to the longitudinal axis of the mid-portion of the channel. A fiber inserted from the other end of the channel experiences the same deflection in bending so that its end is also disposed within the top cusp 112 and with its longitudinal axis parallel to the axis of the straight mid-portion of the channel. Accordingly, when the two fibers abut in the upper cusp 112 of the mid-portion 126 of the channel 110, their ends 138 and 140 are aligned angularly as well as axially, thereby resulting in a good light transmissive joint.

FIG. 8 shows the condition of the fibers in the guide where the good light transmissive joint is formed. The fiber portions external to the guide are shown unsupported and unconstrained.

In all embodiments of the guides of the instant invention the points on the guide which come into contact with the fiber are rounded, i.e., not sharp, to eliminate microbending losses in the fiber. For the guide 100 that entails rounding the edges of both ends (mouths) of the channel and the elbows in the channel.

It must be pointed out at this juncture that while the guide 100 shown in FIG. 7 is a preferred embodiment of the guide of this invention, the guide can take various other forms, if it defines a channel having a straight central or mid-portion including a longitudinally extending upper corner or cusp and at least one end portion, extending downward at an angle to the mid-portion and including an open mouth. For example, in FIG. 14, there is shown another double elbow end guide of this invention. As can be seen the guide 200 is formed of three glass cylinders 202, 204, and 206 connected together to form a tricuspid interstitial channel 208 therebetween and having an upper cusp 210 and a pair of lower cusps 212 and 214. The mid-portion 216 of the guide is straight while ends 218 and 220 extend downward at an angle to the central portion so that the channel 208 includes a straight central portion having a longitudinally extending upper cusp and a pair of end portions extending downward at an angle to the mid-portion.

As should be appreciated by those skilled in the art, the angularly extending end portions 218 and 220 of the guide 200 cooperate with the straight mid-portion of the guide 200 to effect the positioning of the opposed ends of the fibers into axial and angular alignment and abutment within the top cusp 210 of the guide 200.

To that end insertion of a fiber end into the mouth of the channel 208 causes it to slide or skew into either of the two lower cusps 212 or 214 in the end portion 218 of the guide. Continued insertion of the fiber into the guide causes the end of the fiber to slide up that lower cusp. At some point in the continued insertion of the fiber into the guide, an upstream top surface portion of the fiber makes contact with and moves into the upper cusp 210 at the guide's mouth while the fiber end is still within the lower cusp. Continued insertion of the fiber causes the fiber end to pass over the elbow (i.e., the point at which the mid-portion 216 merges with the end portion 218) and slide along the channel surface forming that lower cusp in which it had been disposed, heading toward the upper cusp 210. Continued insertion of the fiber into the channel causes the fiber end to make contact with the upper cusp. From that point onward the fiber is biased into the desired axial and angular alignment in the precise manner as discussed with reference to guide 100.

Like guide 100, the cylindrical members 202, 204 and 206 need not be the solid rods shown, can be formed of materials other than glass, and needn't be secured together to form an integral unit.

In FIG. 15, there is shown yet a further alternative embodiment of a double elbow end guide in accordance with this invention. As can be seen, the guide 300, instead of comprising interconnected cylindrical members or rods like guides 100 and 200, is formed as a bent tube. To that end, the tube is an elongated hollow member defined by four sidewalls 302, 304, 306 and 308 defining a central channel 310 extending longitudinally therethrough and having four corners or interstices 312, 314, 316 and 318. The corner 312 is the upper corner of the guide and is formed by the adjoining inside surfaces of sidewalls 302 and 304. The corner 314 is the right side corner and is formed by the adjoining inside surfaces of sidewalls 304 and 306. The corner 316 is the bottom corner and is formed by the adjoining inside surfaces of sidewalls 306 and 308. The corner 318 is the left corner formed by the adjoining inside surfaces of sidewalls 308 and 302.

Like the guides 100 and 200, the tubular guide 300 includes a straight central or mid-portion 320 and a pair of end portions 322 and 324, each of which extends downward at an acute angle to the mid-portion.

As should be appreciated by those skilled in the art, the guide 300 operates in similar manner to the guides 100 and 200 to align the ends (not shown) of a pair of optic fibers 330 and 332 in the upper corner 312 so that a good light transmissive joint results.

In accordance with a preferred aspect of the invention, the open ends of each channel are in the form of an enlarged mouth to facilitate the insertion of a fiber therein. Accordingly, as can be seen in FIG. 7, each end 136 of channel 110 of the guide 100 is flared. The flared ends are preferably formed by inserting a heated dowel into the open ends of the channel. It should of course be recognized that the enlarged mouth at each end of the channel can be formed in other ways as well, e.g., reducing the cross-sectional area of each rod at the end, such as by etching as described heretofore with reference to the guide embodiment 20 shown in FIG. 1. It must be pointed out at this juncture that while the preferred embodiments of the guides shown herein do utilize enlarged openings at the ends of their channels, such a construction is not crucial to the instant invention, but does facilitate insertion of the fiber into the channel.

As will be described in detail hereinafter, there are six principal interrelated parameters for the fiber guides in accordance and the fiber geometry which must be optimized for reproducible fiber alignment and low fiber stress in such guides. The principal parameters are shown schematically in FIGS. 13A and 13B which represent one end, e.g., end 122, of the guide 100 shown in FIG. 7. More particularly FIG. 13A represents a longitudinal section of the end 122 of the guide 100 while FIG. 13B represents a transverse section taken at any point through the fiber guide normal to the longitudinal axis at that portion of the guide.

The six parameters establishing the construction of the guide are as follows: Length, X, of each angularly extending end portion of the guide, the minimum length, Y, of the straight mid-portion necessary to bring one fiber onto axis within the top cusp therein, the diameter of the fiber, $D_F$, the effective diameter of the channel, $D_E$, the angle $\theta$ which each end portion makes with the straight mid-portion of the guide and the radius of curvature $R_C$ that each fiber is forced to adopt in passing through the guide for disposition of its end within the top cusp of the guide and parallel to the longitudinal axis of the mid-portion of the guide.

The bending of any optic fiber through too small an arc will result in the immediate breakage of the fiber. Even a less severe bend will, after a long period, result in the breakage of the fiber due to static fatigue. The radius of curvature about which a fiber can be bent before experiencing static fatigue is a function of fiber diameter and can be readily calculated by those skilled in the art. Since the guide of the instant invention effects the bending of the fibers therein, static fatigue effects must be considered in designing a viable guide.

As will be appreciated by those skilled in the art, since the guides of the instant invention make use of tapered upper interstices, e.g., cusps, for effecting fiber alignment, the effective channel diameter, $D_E$, is a function of the diameter of the rods or cylinders making up the guide as well as the diameter of the fibers disposed in the guide and can be readily calculated from the geometry of a transverse cross section of the channel. For example, the effective channel diameter, $D_E$, for a four cylinder member constituted guide, e.g., guide 100, is defined by the following formula:

$$D_E = 2\{(R_R+R_F) - [(R_R+R_F)^2 - R_R^2]^{\frac{1}{2}}\} \quad (1)$$

where $R_R$ is the radius of the rods and $R_F$ is the radius of the fiber.

Since the fibers are loosely fit in the channel the slack, d, in the channel measured in the transverse direction is equal to the difference between the effective channel diameter, $D_E$, and the fiber diameter $D_F$.

Since the fiber ends are not aligned when they first enter the upper cusp of the mid-portion, the straight mid-portion 126 of the guide must be of a certain minimum length to ensure that the ends of both fibers are bent sufficiently after making contact with the upper cusp to ensure that each extends parallel to the longitudinal axis of the mid-portion of the guide within the upper cusp. In FIG. 13A, the minimum length of the mid-portion required for each fiber to assume such axial alignment is denoted by Y.

The radius of curvature that the fiber experiences in passing from the angularly extending end portion of the channel to the straight mid-portion of the channel, is denoted by $R_C$ and is defined by the following formula:

$$R_C = \frac{Y^2 + (D_E - D_F) D_E}{2(D_E - D_F)} \quad (2)$$

In order to ensure that the guide does not subject the fibers to static fatigue, the value for $R_C$ is selected to be significantly greater than the minimum radius of curvature that fibers of their diameter can safely endure without exhibiting static fatigue. For example, with a 5 mil fiber, $R_C$ is selected to be no less than two inches (50.8 mm). Thus using formula (2) one is able to calculate the minimum length, i.e., Y, of the mid-section of the guide necessary to bring the end of one fiber into axial alignment in the upper cusp. A similar minimum length, Y, is necessary to bring the end of the other fiber into such alignment. In order to ensure that both fibers are brought into axial alignment, even if one is inserted more than half way into the mid-portion, the length of the mid-portion of the channel is preferably made slightly longer than 2Y to provide a zone in which the fiber ends can be abutted while the ends remain axially aligned.

The angle, $\theta$, in radians, that each end portion 122 and 124 makes with the straight mid-portion of the guide is defined by the following formula:

$$\theta = 180 - \cos^{-1}\frac{(X^2+Y^2)d}{(d^2+Y^2)X} - \cos^{-1}\frac{2Yd}{d^2+Y^2} \quad (3)$$

where X represents the length of each angularly extending end portion of the guide, measured from the point at which the end portion joins the straight mid-portion and to the bottom of the flared mouth 136 at the open end of the end portion.

For guides whose channel slack, i.e., $D_E - D_F$, is small as compared to the length of the channel, as is the case with most guides, formula (3) may be simplified to:

$$\theta = \frac{(X+Y)^2(D_E-D_F)}{XY^2} \quad (4)$$

For guides in which the channel slack, $D_E - D_F$ approaches approximately 10% of the length of the channel, the formula (3) should be used.

The total length of the guide, measured in a longitudinal direction from end to end, is denoted by $G_L$ and is defined by the formula:

$$G_L = 2Z \cos\theta + 2X \cos\theta + 2Y \qquad (5)$$

where Z represents the depth of the flared mouth at each end of the channel. For guides not utilizing a flared mouth, and hence where Z=0, formula (5) becomes:

$$G_L = 2X \cos\theta + 2Y \qquad (6)$$

Using formulae (1), (2), (3) or (4) and (5), one is able to establish the dimensions for a guide which will ensure axial alignment of a pair of optic fibers within its upper cusp. For example, if the guide is to be used within the cavity of a connector, like the connector shown in FIG. 2, or any other suitably configured connector, the length of the cavity will establish the maximum length for the guide.

In Hodge et al. U.S. patent application Ser. No. 943,470, filed on Sept. 18, 1978, assigned to the same assignee as this invention and whose disclosure is incorporated by reference herein, there is disclosed and claimed a connector construction which is particularly suited for housing the guides of this invention and particularly the guide 100.

The effective diameter of the channel, as noted heretofore, is selected to be substantially greater than the outside diameter of the fiber, e.g., twice as large. Accordingly, using formula (1), the radius of each of the cylindrical members or rods 102–108 is determined. Since the minimum radius of curvature that the selected diameter fiber can experience without static fatigue is known, the minimum length, Y, of the straight mid-portion of the guide which is necessary to bring the end of one fiber into axial alignment in the upper cusp thereof is determined using formula (2). Once the minimum length of the mid-portion is established, the angle, $\theta$, that the end portion makes with respect to the mid-portion, and the length, X, of each end portion and depth, Z, of the flare therein can be established using the formulae (3) and (5) or (4) and (5), depending upon the length of the guide.

As noted heretofore, the guides of the instant invention are arranged to bring the ends of a pair of optic fibers into such close proximity that a good low light loss interface or joint results. Accordingly, it is desirable that the fibers be extended into the guide until their ends abut. Since the ends of the fibers are quite small in cross-sectional area, and since fiber ends may not be perfectly flat or perpendicular to the axis of the fiber, the pressure applied to the portions of fiber end faces which do make contact can result in damage to the fiber faces if an attempt is made to impel the fibers further into the guide after the end faces meet.

In order to prevent the occurrence of excess pressure on abutting fiber ends, the guides of the instant invention and the connector's housing such guides are arranged to leave the fibers laterally unrestrained over a short distance immediately outside the mouth of the channel in the guide to take up any fiber overtravel.

The double elbow guides of the instant invention, by virtue of their angularly extending end portions, inherently cause the fiber portions lying immediately outside the channel's mouth, i.e., the emerging fiber portion, to extend at a slight angle to the axis of the mid-portion of the guide. The off-axis angle is denoted by $\phi$ in FIG. 13A. Since the cables for the fibers being connected in the guide normally extend axially into the connector which houses the guide (as shown in FIG. 2), the portions of the fibers emerging from the guide naturally assume a shallow box (shown in FIG. 9), which is predisposed to buckle. Accordingly, in the event that an attempt is made to further insert the fibers into the guide, once their ends have made contact, the emerging fiber portions deflect or bow further outside of the guide to take up the attempted overtravel. This action is shown in FIG. 10 and automatically restricts the mutual fiber end pressures to levels below which face impairment would occur.

The off axis angle, $\phi$, is a function of the channel slack, $D_E - D_F$, the length, X, of the angled end portion of the guide as well as the angle, $\theta$, which the end portion of the guide makes with the mid-portion and is defined by the formula:

$$\phi = \theta - \tan^{-1}\frac{(D_E - D_F)}{X} \qquad (7)$$

where $\phi$ is measured in radians.

The pressure to which each abutting fiber face is subjected is defined by the formula:

$$P = \frac{IE(L + X)}{L^2 X} \cdot \frac{\phi}{\sin\phi} \qquad (8)$$

where I is the moment of inertia of the fiber, E is Young's modulus (the modulus of elasticity of the fiber) and L is the length of the fiber external to the guide (the unrestrained or bowed portion of the fiber).

As should be appreciated from the foregoing, so long as the guides of this invention are constructed to impress a biasing bending moment on each fiber end inserted therein, each end will naturally assume a position in the uppermost corner or cusp of the guide despite the lack of close dimensional tolerances of the fibers or the channel in which they are disposed. The automatic positioning of the fibers in a unique corner of the channel precludes the danger of the fiber ends missing each other completely if the channel slack is greater than twice the fiber diameter.

For double elbow end guides of the instant invention, compliance with the design parameters set forth above not only ensures that the fiber ends are located within the same upper corner of cusp in the guide but also ensures that both ends are automatically disposed parallel to the longitudinal axis of the mid-portion of the guide, and are, hence, angularly aligned as well as axially aligned with each other. Moreover, the double elbow end guides of the instant invention automatically predispose the emerging fiber portions at an angle to the longitudinal axis of the portion of the guide where the fiber ends meet, thereby enabling such fiber portions to flex or buckle to absorb any fiber overtravel after the fiber ends have met. Such action prevents fiber face damage due to the imposition of excess pressure thereon.

The formation of glass cylindrical member composed guides, e.g., guides 20, 100 and 200, of the instant invention is accomplished in accordance with the following method. Indeterminant length glass rods or other cylindrical glass members for forming the guide are disposed in a side-by-side array parallel to one another and are drawn while the members are hot to cause them to contact and fuse together to form straight guide stock having a cusp-shaped interstitial channel extending therethrough in the manner disclosed in my U.S. patent application Ser. No. 758,106, filed on Jan. 10, 1977, and claimed in the Streamlined Continuation Application based thereon and filed concurrently herewith. A section of the guide is then cleaved from the formed guide stock.

Figure 16A:
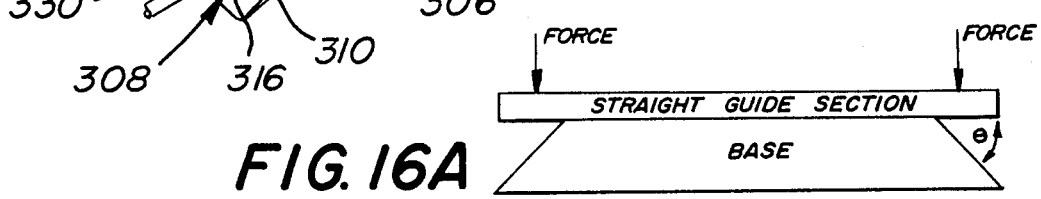
FIGS. 16A and 16B are schematic diagrams depicting a part of the method of the instant invention forming a guide of the instant invention.
Figure 16B:
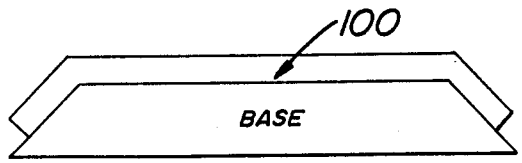

If the guide is to include flare channel mouths, a heated mandrel is inserted into each end of the channel to form each flared mouth. The straight guide section, with or without flared mouths, is then disposed on a base, as shown schematically in FIG. 16A. The base has a flat central top portion and angularly extending end portions. The central portion of the base is as long as the mid-portion of the guide to be formed and the angle that the end portions of the base make with respect to the flat central portion is equal to $\theta$. The guide section is heated on the base while a force is applied to each end of the section, whereupon the ends bend into the desired orientation, i.e., $\theta$ radians with respect to the straight mid-portion to complete the formation of the guide as shown in FIG. 16B. The angled end portions of the base prevent excess deflection of the guide ends.

All the guides of the instant invention as described heretofore, can be used in connector assemblies for effecting a releasable connection between a pair of fiber ends. As will be appreciated by those skilled in the art, the guides can also be used to permanently connect, i.e., splice, the fiber ends together within the guide. In such application the fibers are permanently secured by some means, e.g., epoxy, within the guide, thus obviating the need for a connector assembly.

Moreover, while those guides of the instant invention which are shown in the drawings herein include only a single channel, it is clear that the guides can be constructed to include plural channels, with each channel being adapted for effecting the connection of a pair of optic fiber ends therein.

It must be pointed out at this juncture that the guides of the instant invention are not limited to connecting a pair of optic fiber ends, like shown in the drawings. In this regard, the guides of the instant invention can also be used to effect the precise positioning of the end of a single optic fiber in a fiber optic communication system. In such applications the guides are constructed so they only include one end portion extending at an acute angle to the mid-portion. Such alternative construction can be readily accomplished by cleaving the guides shown in the drawings herein at some point in the mid-section, e.g., the mid-point. Accordingly, when a fiber is disposed within the guide, its end face will be located within the upper corner of the mid-portion with its axis parallel to the longitudinal axis thereof, and with its end face disposed at the open free end of the mid-portion.

Moreover, the guides of the instant invention can be used to effect the connection between one end of an optic fiber and a light active element, e.g., light emitting diode, (LED), photoresistor, photocell, etc. In such applications the guides also need only include a single end portion extending at an acute angle from the mid-portion. Thus, FIG. 17 illustrates a half guide 141, which may comprise one half of a guide, such as guide 100 of FIG. 8. Half-guide 141 precisely positions an end of an optic fiber 143 in desired light transmissive engagement with a central portion of a light emitting diode 145. A light active element, having a short length of optic fiber or "pigtail" connected thereto can be secured to the open end of the mid-portion in a manner like that disclosed in U.S. patent application Ser. No. 854,925, filed on Nov. 25, 1977, which matured into U.S. Pat. No. 4,120,443, granted May 6, 1980, whose disclosure is incorporated by reference herein, and which has been assigned to the same assignee as the instant invention, so that the pigtail is disposed within the upper cusp of the mid-portion. Thus, when the end of an optic fiber is inserted into the mouth of the angularly extending end portion of the guide, the fiber will be automatically positioned into axial as well as angular alignment with the end of the pigtail therein.

The selection of any particular construction for the guides of the instant invention will necessarily involve consideration of various competing factors, e.g., size of guide, size of channel, channel density, frictional resistance to fiber insertion, sensitivity to fiber diameter mismatch, precision of fiber alignment, fabrication ease, costs, physical stability, etc. Thus, while the double-elbow end guides are preferred embodiments, with the four-rod embodiment 100 thereof being the preferred double-elbow guide, the guides of the instant invention can be formed in various manners depending on the application and design goals.

The following factors demonstrate the desirability of a four member double-elbow end guide, e.g., 100, over a three-rod double-elbow end guide, e.g., 200, where such factors are important. To that end since the four-rod guide 100 is intrinsically substantially smaller in outer diameter than a three-rod guide 200 having the same effective channel diameter, the four-rod embodiment provides the advantages of superior channel density, less glass usage, lower mass, lower cost than the three-rod embodiment.

Furthermore, a three-rod guide presents less precise guidance for the fiber into the top channel while exhibiting greater frictional resistance to fiber penetration into the guide than a four-rod guide. The less precise guidance and increased friction of a three-rod guide results from the fact that there is no lower cusp located directly below the upper cusp to help direct the fiber end into the upper cusp. Hence, insertion of the fiber end into the channel causes the fiber to slide or skew into either of the two laterally located lower channels and thereafter the fiber end slides along the contiguous channel surface up to the upper cusp. In contradistinction, in a four-rod embodiment guide the fiber end moves from the lower cusp across the channel to the diametrically disposed upper cusp and does not slide along any interposed surface.

Moreover, since the guides of this invention effect the automatic biasing of a fiber into a converging interstice formed between the cylindrical members making up the guide, the smaller the fibers are, the deeper the penetration into the interstice. Because of the increasing steepness of the adjoining converging walls forming the interstice as the interstice narrows, mutual fiber alignment will become a more critical function of relative fiber diameter. For equivalent size channels, a four-rod guide is composed from rods substantially smaller in diameter than the rods of a three-rod guide. Thus, the four-rod guide is less sensitive to any fiber diameter mismatch.

For applications where stability and strength are primary considerations, and more precise fiber alignment and diminutive size are of less importance, the three cylindrical member guide would be selected over a four member guide.

As should be appreciated from the foregoing, the optic fiber alignment guides of the instant invention are simple in construction and offer viable approaches to the accurate alignment and positioning of the ends of the optic fibers. To that end the guides of the instant invention tolerate less precision in the size of the fibers and/or channel than the guides of my U.S. patent application Ser. No. 758,106, while nevertheless effecting precise optical alignment of the fiber by automatically positioning the fiber ends into a unique and predetermined interstice in the fiber holding channel. The guides of the preferred embodiments also ensure that abutting fiber ends are aligned angularly as well as axially, despite the lack of close dimensional tolerances of the fiber or the channel in which they are disposed. Thus, the preferred embodiment guides create very high tolerance fiber alignment in a relatively low tolerance assembly.

It must be pointed out at this juncture that in the foregoing specification and in the claims following hereafter, directions such as vertical, upper, downward, etc., are used merely to describe the orientation of portions of the invention relative to other portions thereof as shown in the drawings herein. Accordingly, such directional words should not be construed as limiting disposition of the guide or fibers therein to any particular absolute spatial orientation or plane.

Without further elaboration, the foregoing will so fully illustrate my invention that others may, by applying current or future knowledge, readily adapt the same for use under various conditions of service.

What is claimed as the invention is:

1. A guide for use in making an optical signal transmissive connection between the ends of two optic fibers comprising a body having a fiber-receiving channel therein; said channel including a first portion and a second portion communicating with said first portion; said second portion being so oriented relative to said first portion whereby the end of a first optic fiber inserted through said second portion into said first portion is guidingly bent by said second portion of said channel to a locus aligned along a predetermined axis in said first portion of said channel for alignment with the end of another optic fiber disposed along said axis to form a good light transmissive joint therebetween.

2. The guide of claim 1 wherein said channel includes a third portion communicating with said first portion; said third portion being so oriented relative to said first portion, whereby the end of a second optic fiber inserted through said third portion is guidingly bent by said third portion of said channel to a locus aligned along said predetermined axis of said first portion of said channel for alignment with such first optic fiber to form a good light transmissive joint therebetween.

3. The guide of claim 1 in which said axis is coincident with an interstice defined by adjacent cylindrical members defining said channel.

4. The guide of claim 1 in combination with an optic fiber which extends through said guide second portion and has an end aligned along said predetermined axis.

5. A guide for use in making an optical signal transmissive connection between the ends of two optic fibers comprising a body having a fiber-receiving channel extending therein; said channel including a first channel portion and an adjacent channel portion at each end of said first channel portion; the adjacent channel portions being so oriented relative to said first portion as to guidingly bend portions of optic fibers passing therethrough into said first portion against substantially axially aligned surface portions of said first channel portion whereby the ends of two optic fibers inserted into said first portion of said channel through said adjacent portions are guidingly bent by said adjacent portions into alignment with one another on said surface portions of said first channel portion to form a good light transmissive connection therebetween.

6. The guide of claim 5 in combination with optic fibers extending through said adjacent channel portions and having ends aligned in said first channel portion and forming a good light transmissive connection.

7. The guide of claims 1 or 5 wherein said first portion of said channel is linear.

8. The guide of claims 1 or 5 wherein said body is formed of at least three predetermined length cylindrical members disposed in a side-by-side array parallel to one another, with longitudinal peripheral portions of adjacent members in contact with each other to form said channel therebetween; said channel being cusp-shaped and with an upper cusp forming a fiber-aligning track.

9. The guide of claim 8 wherein said cylindrical members are four in number and formed of glass.

10. The guide of claim 9 wherein the glass cylindrical members are fused together to form an integral body.

11. The guide of claim 8 wherein said members are arcuate along the entire length of said guide so that said channel is arcuate along its entire length.

12. The guide of claims 1 or 5 wherein the distal ends of said channel are larger in cross-section than the remaining portions of said channel.

13. The guide of claims 1 or 5 wherein said guide first portion is arcuate.

14. The guide of claims 1 or 5 wherein said guide is provided in a cylindrical housing having a pair of openings at the ends thereof which are tapered inwardly to provide a large opening at each end of the guide to facilitate the insertion of optic fiber ends into said guide.

15. A guide for use in making an optical signal transmissive connection between the ends of two optic fibers comprising a body having a channel extending therein; said channel including a mid-portion and a first end portion; the first end portion of said channel having an open distal end; the mid-portion of said channel having an upper interstice extending longitudinally along the mid-portion; said first end portion being so configured relative to said mid-portion, whereby the end of a first optic fiber inserted into said channel mid-portion is guidingly bent by portions of said channel into said upper interstice.

16. The guide of claim 15 wherein said channel includes a second end portion having an open distal end; said second end portion being so configured relative to said mid-portion, whereby the end of a second optic fiber inserted through the open distal end in said second end portion is guidingly bent by portions of said channel into the upper interstice of said channel mid-portion for alignment with the end of such first optic fiber to form a good light transmissive joint therebetween.

17. The guide of claim 16 wherein the open ends of the channel are larger in cross-section than the remaining portions of said channel.

18. The guide of claim 16 wherein said body is in the form of a tube made up of converging interior surfaces with adjacent converging surfaces forming said upper interstice.

19. The guide of claim 16 in combination with optic fibers extending through the channel end portions and having ends aligned in said interstice and forming a good light transmissive connection.

20. The guide of claim 15 wherein said body is formed of at least three predetermined length cylindrical members disposed in a side-by-side array parallel to one another with longitudinal peripheral portions of adjacent members in contact with each other to form said channel therebetween; said channel being cusp-shaped with said upper interstice being a cusp.

21. The guide of claim 20 wherein said cylindrical members are four in number and formed of glass.

22. A guide for use in making an optical signal transmissive connection between the ends of two optic fibers comprising a body formed of at least three predetermined length cylindrical members disposed in a side-by-side array parallel to one another with longitudinal peripheral portions of adjacent members in contact with each other to form a fiber-receiving channel therebetween; said channel being cusp-shaped and having an upper interstice comprising a cusp; said channel including a mid-portion interposed first and second end portions having open terminal ends; said upper interstice extending longitudinally along the mid-portion; said end portions extending angularly to said mid-portion whereupon the end of a first optic fiber inserted into either open end of said channel is guidingly bent by portions of said channel into the upper interstice thereof for alignment with the end of another optic fiber disposed therein to form a good light transmissive joint therebetween.

23. The guide of claim 22 wherein said body is defined by the following formulae:

$$\theta = 180° - \cos^{-1}\frac{(X^2 + Y^2)d}{(d^2 + Y^2)X} - \cos^{-1}\frac{2Yd}{d^2 + Y^2} \quad (1)$$

$$R_C = \frac{Y^2 + (D_E - D_F)D_E}{2(D_E - D_F)} \quad (2)$$

where X is the length of the guide end portions, Y is the minimum length of the guide mid-portion required for each fiber to assume axial alignment, $D_E$ is the effective diameter of the channel, $D_F$ is the outside diameter of the optic fibers, $R_C$ is the radius of curvature the fiber experiences in the guide, $\theta$ is the angle in radians of the guide end portions relative to the mid-portion, and d is the difference between $D_E$ and $D_F$.

24. The guide of claim 23 wherein the length L of the guide is defined by the formula:

$$L = 2Y + 2X\cos\theta.$$

25. The guide of claim 22 wherein said guide comprises four cylindrical members disposed in a substantially square array the effective diameter $D_E$ of said guide is defined by the formula:

$$D_E = 2\{(R_R + R_F) - [(R_R + R_F)^2 - R_R^2]^{\frac{1}{2}}\}$$

where $R_R$ is the radius of the cylindrical members making up the guide and $R_F$ is the radius of the optic fibers.

26. A guide for use in making an optical signal transmissive connection between the ends of two optic fibers comprising a body having interior surfaces defining a fiber-receiving channel in said body; said channel including a first portion and a second portion communicating with said first portion; said second portion being so oriented relative to said first portion whereby the end of a first optic fiber inserted through said second portion into said first portion is guidingly bent by surface portions of said guide defining said channel to a locus disposed along a predetermined axis in said first portion of said channel for alignment with the end of another optic fiber disposed along said predetermined axis to form a good light transmissive joint therebetween.

27. The guide of claim 1, or 26 wherein the orientation of said guide channel second portion relative to said first portion causes a portion of an optic fiber entering said guide first portion through said second portion and located immediately outside said guide second portion to be at an angle to the longitudinal axis of said first portion, and in further combination with means for positioning an optic fiber prior to entering said guide second portion substantially parallel to the axis of said guide channel first portion, whereby such portion of the fiber outside of said second portion forms a bow and attempted insertion of an excessive fiber length into said guide after engagement of the end of such optic fiber with the end of another optic fiber therein will result in further curvature of such bow portion exteriorly of said guide.

28. A guide for use in making an optical signal transmissive connection between the ends of two optic fibers comprising a body having a fiber-receiving channel therein; said channel including a first portion and a second portion communicating with said first portion, said second portion being so oriented relative to said first portion whereby the end of a first optic fiber inserted through said second channel portion into said first portion is guidingly bent by portions of said channel to a locus disposed along a predetermined axis of said first portion of said channel for alignment with the end of another optic fiber disposed along said axis to form a good light transmissive joint therebetween; said body being formed of predetermined length cylindrical members disposed in a side-by-side array parallel to one another with longitudinal peripheral portions of adjacent members in contact with each other to form said channel therebetween; said channel being cusp-shaped and with opposed cusps forming a fiber-aligning track; one of said cusps being coincident with said predetermined axis.

29. The guide of claims 25 or 28 in combination with a third channel portion communicating with said first portion and so oriented relative thereto whereby the end of a second optic fiber inserted through said third portion is guidingly bent by portions of said channel to a locus disposed along said predetermined axis of said first portion for alignment with such first optic fiber to form a good light transmissive joint therebetween.

30. The guide of claims 1, 5, 16, 22, 26 or 28 in combination with optic fibers disposed therein effecting a good light transmissive connection, and held in place in said connection as a result of the bending action imparted thereto by portions of said guide channel.

31. A guide for use in making an optical signal transmissive connection between the ends of optic fibers comprising a body having interior surfaces defining a fiber-receiving channel in said body; said channel having a first portion and an adjacent channel portion at each end of said first portion; the adjacent channel portions being so oriented relative to said first portion that interior surfaces defining said channel guidingly bend optic fiber portions inserted through the channel end portions into the first channel portion against substantially axially aligned interior surface portions of said channel first portion, whereby the ends of two optic fibers inserted into said first portion of said channel through said adjacent channel portions are guidingly bent to form a good light transmissive connection therebetween on said aligned interior surface portions of said channel first portion.

32. A method for making a guide for effecting an optical signal transmissive connection between the ends of a pair of optic fibers, comprising the steps of arranging at least three elongated glass members having cylindrical surface portions in a side-by-side array parallel to one another, with longitudinal peripheral portions of said members in contact with each other while said members are hot to cause them to fuse together to form an integral unit having a fixed size, cusp-shaped interstitial channel whose surfaces are smooth, and thereafter deflecting the ends of said members through a predetermined angle with respect to the mid-portions thereof while said members are hot.

33. The method of claim 32 wherein said members are drawn while hot.

34. In a method for positioning one end of a first optic fiber in a precise manner at a desired location in an optic fiber guide for making an optical signal transmissive connection, said guide having a bent channel including a longitudinally extending interstice defined by converging wall surfaces and being of a length adequate to axially align an end portion of an optic fiber received therein, the steps comprising inserting an optic fiber into a first end of said guide channel and guidingly bending such fiber along a predetermined path defined by said channel; biasing the free end of said first optic fiber into said interstice whereby said fiber free end is axially aligned therein, and locating said free end at a desired position along said interstice.

35. The method of claim 34 in which said guide has opposed bent channel portions communicating with a central channel portion having said longitudinally extending interstice, and in combination with the step of inserting a second optic fiber in a second end of said guide and guidingly bending said second optic fiber along a second predetermined path positioned at an angle to said longitudinally extending interstice so as to automatically bias the free end of said second fiber into said interstice to form a good optical signal transmissive connection with the free end of said first fiber.

36. In a method for positioning the end of an optic fiber in a precise manner along a desired axis in an optic fiber guide for making an optical signal transmissive connection; said guide having a channel including a longitudinally extending channel central portion, and a channel first end portion connected to said central portion and oriented relative to said central portion whereby insertion of an optic fiber through said channel first end portion into said central portion guidingly bends the end of such inserted fiber onto said desired axis; the steps comprising inserting a first optic fiber into the channel first end portion; and guidingly bending said optic fiber by passing the end of said first fiber through said channel first end portion into said channel central portion whereby the end of said fiber is urged onto said desired axis; and moving the end of said fiber into a desired position along said desired axis.

37. The method of claim 36 in which said guide has a channel second end portion connected to said channel central portion and oriented relative to said channel central portion similarly to said claimed first end portion; and in combination with the steps of inserting a second optic fiber into said channel second end portion, and guidingly bending said second fiber by insertion through said channel second end portion whereby the end of said second fiber is urged onto said desired axis; and effecting a desired light transmissive connection between the ends of said first and second fibers along said desired axis.

38. A connector comprising a guide for use in making an optical signal transmissive connection between the ends of two optic fibers and having a body with a fiber-receiving channel therein; said channel including a first portion and a second portion communicating with said first portion; means for positioning optic fibers to be connected in said channel substantially axially of said connector; said channel second portion being so oriented relative to said first portion whereby the end of a first substantially axially extending optic fiber inserted through said second portion into said first portion is guidingly bent by said second portion of said channel to a locus aligned along a predetermined axis in said first portion of said channel for alignment with the end of another optic fiber disposed along said axis to form a good light transmissive joint therebetween; the orientation of said channel second portion relative to said first portion also causing a portion of such first fiber located immediately outside said second portion to be at an angle to the longitudinal axis of the channel first portion and form a fiber bow whereby attempted insertion of an excessive fiber length into said guide will result in further curvature of such fiber exteriorly of said guide at said fiber bow.

39. A connector comprising a guide for use in making an optical signal transmissive connection between the ends of two optic fibers and having a body with a fiber-receiving channel extending therein; said channel including a first channel portion and an adjacent channel portion at each end of said first channel portion; means for positioning optic fibers to be connected in said channel substantially axially of said connector; said adjacent channel portions being so oriented relative to said first portion as to guidingly bend portions of optic fibers passing therethrough into said first portion against substantially axially aligned surface portions of said first channel portion whereby the ends of two, substantially axially extending optic fibers inserted into said first portion of said channel through said adjacent portions are guidingly bent by said adjacent portions into alignment with one another on said surface portions of said first channel portion to form a good light transmissive connection therebetween; the orientation of said adjacent channel portions relative to said first portion causing a portion of an optic fiber located immediately outside each of said adjacent portions to be at an angle to the longitudinal axis of the channel first portion and form a fiber bow whereby attempted insertion of an additional fiber length into said guide after abutment of the ends of said fibers in said guide channel first portion will result in formation of strain relief bows exteriorly of said guide by further curvature of said bows.

40. A connector comprising a guide for use in making an optical signal transmissive connection between the ends of two optic fibers and having a body with a fiber-receiving channel therein; said channel including a first portion and a second portion communicating with said first portion; means for positioning optic fibers to extend into and to be connected in said first portion of said channel; said channel second portion being so oriented relative to said first portion whereby the end of a first optic fiber inserted through said second portion into said first portion is guidingly bent by said second portion of said channel to a locus aligned along a predetermined axis in said first portion of said channel for alignment with the end of another optic fiber disposed along said axis to form a good light transmissive joint therebetween; said second portion at the entrance of said guide being angularly disposed relative to the axis of said first fiber in said positioning means such that upon insertion of said first fiber into said guide, a bow is induced in said first fiber between said guide and said positioning means which is predisposed to buckle upon abuttment of said fiber with a mating fiber within said guide.

41. A connector as in claim 38, 39 or 40 wherein said guide and said positioning means are oriented with said first portion of said channel generally parallel to the axes of fibers positioned by said positioning means.

42. A connector as in claim 41 wherein said positioning means comprises means for engaging cables which include such optic fibers.

43. A connector as in claim 42 wherein said connector includes openings for receiving such cables, and a cable adhesively received in each such opening and having an optic fiber extending into said guide.

44. A guide for making an optical signal transmissive connection between the ends of two optic fibers comprising a body having interior surface portions defining an elongated channel extending through said body for receiving end portions of such fibers in end-to-end connection; said channel including a medial channel portion having an effective diameter which is at least slightly larger than the diameter of each of such optic fibers so as to readily receive such fiber end portions therein; said channel also including an elongated adjacent channel portion extending outward from each end of said medial channel portion; each of said adjacent channel portions extending at an angle to said medial portion on a first side thereof for guidingly bending fiber portions which are extended through said adjacent portions into said medial portion against predetermined longitudinally aligned internal surface portions along the side of said medial channel portion opposite said first side regardless of the angle at which said fibers extend from the distal ends of said adjacent channel portions, whereby end-to-end alignment of the ends of such fibers with each other is assured on said internal surface portions along said opposite side of said medial portion.

45. A guide according to claim 44 for making an optical signal transmissive connection between the ends of two optic fibers wherein said channel medial portion and adjacent portions lie along a continuously arcuate curve.

46. A guide according to claim 44 for making an optical signal transmissive connection between the ends of two optic fibers wherein said channel medial portion is essentially straight, and said adjacent portions include arcuate bend portions adjoined to said medial portion and straight portions extending from said arcuate bend portions.

47. In combination, first and second optic fibers and a guide for making an optical signal transmissive connection between the ends of said fibers; said guide comprising a body having interior surface portions defining an elongated channel extending through said body for receiving end portions of said fibers in end-to-end connection; said channel including a medial channel portion having an effective diameter which is at least slightly larger than the diameter of each of said optic fibers so as to readily receive said fiber end portions therein, and said channel also including an elongated adjacent channel portion extending outward from each end of said medial channel portion; each of said adjacent channel portions extending at an angle to said medial portion on a first side thereof, said first fiber extending through one of said adjacent portions and having an end portion within said medial portion; said second fiber extending through the other of said adjacent portions and having an end portion within said medial portion; said adjacent channel portions guidingly bending said fibers and thereby positioning said end portions against predetermined longitudinally aligned internal surface portions along the side of said medial channel portion opposite said first side regardless of the angle at which said fibers extend from the distal ends of said adjacent channel portions, whereby end-to-end alignment of the ends of such fibers with each other is assured on said internal surface portions along said opposite side of said medial portion.

48. A guide for making an optical signal transmissive connection between the ends of two optic fibers comprising a body having interior surface portions defining an elongated channel extending through said body for receiving end portions of such fibers in end-to-end connection; said channel including a medial channel portion having an effective diameter which is at least slightly larger than the diameter of each of said optic fibers so as to readily receive such fiber end portions therein; and said channel also including an arcuate channel portion extending outward from each end of said medial channel portion; each of said arcuate channel portions extending on a first side of said medial portion for guidingly bending fiber portions which are extended through said arcuate portions into said medial portion against predetermined longitudinally aligned internal surface portions along the side of said medial channel portion opposite said first side, regardless of the angle at which said fibers extend from the distal ends of said arcuate channel portions, whereby end-to-end alignment of the ends of such fibers with each other is assured on said internal surface portions along said opposite side of said medial portion.

49. A guide assembly for use in making an optical signal transmissive connection between the ends of two optic fibers comprising a body having interior surface portions defining a fiber-receiving channel extending therein; a pair of optic fibers positioned within said channel and extending outwardly therefrom; said channel including a first channel portion and an adjacent channel portion at each end of said first channel portion; the cross-section of said first channel portion being larger than the cross-section of each of said otic fibers so as to readily receive said fibers therein, said adjacent channel portions being nonlinearly disposed relative to said first channel portion and converging toward each other as they approach said first channel portion from one side thereof so as to guidingly bend the ends of said optic fibers passing therethrough against aligned interior surface portions of said first channel portion on the side of said first channel portion opposite to said one side regardless of the angle at which said fibers enter said channel, thereby aligning said optic fiber ends on said interior surface portions.

50. A guide assembly for use in making an optical signal transmissive connection between the ends of two optic fibers comprising a body having interior surface portions defining an elongate channel having an effective diameter which is greater than the diameter of either of said fibers; said channel being open at opposite ends to receive said otic fiber ends; said body also having portions defining funnel-shaped openings at the ends of said channel for guiding the fibers into the ends of said channel during insertion; said channel having means for guidingly bending the fibers inserted from said opposite channel ends against commonly aligned longitudinal surface portions of said channel and thereby into end-to-end alignment with one another regardless of the angle at which said fibers enter said channel.

51. A guide assembly for use in making an optical signal transmissive connection between the abutting ends of two optic fibers comprising a body having interior surface portions defining an elongate open-ended channel in which said fibers abut; said channel having a substantially uniform effective diameter which is greater than the diameter of each of said fibers; said channel having a longitudinal curvature which guidingly bends said fibers into alignment against longitudinally aligned interior surface portions on the same side of said channel regardless of the angle at which said fibers enter said channel.

52. A connector for splicing optical fibers comprising a longitudinal sleeve having a given curvature; a narrow axial fiber-receiving passageway having a like curvature extending through said sleeve; funnel-shaped openings at each end of said sleeve communicating with said passageway to facilitate the insertion of the ends of optical fibers to be spliced within said sleeve; the diameter of said passageway providing a close fit for said fibers; a pair of optical fibers positioned respectively within each sleeve end so that said fiber ends abut; said passageway curvature guidingly bending said fibers to engage the outer wall portion of the passageway to accurately align said fiber ends, and means adjacent the ends of said sleeve for securing said fibers therein.

53. A guide for use in making an optical signal transmissive connection between the ends of two optic fibers comprising a body having a channel extending therein; said channel including a mid-portion and a first end portion; the first end portion of said channel having an open distal end; the mid-portion of said channel having an upper interstice extending longitudinally along the mid-portion; said first end portion being so configured relative to said mid-portion, whereby the end of a first optic fiber inserted into said channel mid-portion is guidingly bent by portions of said channel into said upper interstice; the orientation of said channel first end portion relative to said mid-portion causing a portion of an optic fiber entering said guide mid-portion through said first end portion and located immediately outside said guide first end portion to be at an angle to the longitudinal axis of said mid-portion, and means for positioning an optic fiber prior to entering said guide first end portion substantially parallel to the axis of said guide channel mid-portion, whereby such portion of the fiber outside of said first end portion forms a bow and attempted insertion of an excessive fiber length into said guide after engagement of the end of such optic fiber with the end of another optic fiber therein will result in further curvature of such bow portion exteriorly of said guide.

54. A guide for positioning the end of an optic fiber at a precise location in a fiber optic communication system, said guide comprising a body having a fiber-receiving channel therein; said channel including a first portion and a second portion communicating with said first portion; said second portion being so oriented relative to said first portion whereby the end of an optic fiber inserted through said second portion into said first portion is guidingly bent by said second portion of said channel to a locus aligned along a predetermined axis of said first portion of said channel, whereby an optic fiber disposed in said guide and having a distal end disposed at the distal end of said guide first portion will be located at such precise location when said guide distal end is located at such precise location.

55. The guide of claim 54 in combination with a light active element disposed at such precise location in adjacency with the distal end of said guide first portion.

* * * * *